(12) United States Patent
Böning et al.

(10) Patent No.: US 8,240,921 B2
(45) Date of Patent: Aug. 14, 2012

(54) AXIAL BEARING FOR A TURBOCHARGER

(75) Inventors: Ralf Böning, Reiffelbach (DE);
Hartmut Claus, Grünstadt (DE); Dirk Frankenstein, Worms (DE); Holger Fäth, Fußgönheim (DE); Jochen Held, Bolanden-Weierhof (DE); Stefan Krauß, Frankenthal (DE); Stefan Nowack, Kirchheimbolanden (DE)

(73) Assignee: Continental Automotive GmbH, Hannover (DE)

( * ) Notice: Subject to any disclaimer, the term of this patent is extended or adjusted under 35 U.S.C. 154(b) by 320 days.

(21) Appl. No.: 12/597,644

(22) PCT Filed: Apr. 22, 2008

(86) PCT No.: PCT/EP2008/054867
§ 371 (c)(1),
(2), (4) Date: Nov. 18, 2009

(87) PCT Pub. No.: WO2008/129046
PCT Pub. Date: Oct. 30, 2008

(65) Prior Publication Data
US 2010/0089057 A1      Apr. 15, 2010

(30) Foreign Application Priority Data
Apr. 24, 2007   (DE) ...................... 10 2007 019 338.8

(51) Int. Cl.
*F16C 17/04*  (2006.01)
*F16C 33/10*  (2006.01)

(52) U.S. Cl. ......... 384/420; 384/112; 384/123; 384/368

(58) Field of Classification Search .................. 384/112, 384/123, 286, 295–297, 368–371, 420–427, 384/561
See application file for complete search history.

(56) References Cited

U.S. PATENT DOCUMENTS

| | | | | |
|---|---|---|---|---|
| 2,752,208 A | * | 6/1956 | Wightman | 384/370 |
| 2,872,256 A | * | 2/1959 | Thomson | 384/420 |
| 3,370,897 A | * | 2/1968 | Rylatt | 384/368 |
| 3,932,930 A | * | 1/1976 | Dochterman | 29/596 |
| 4,639,148 A | * | 1/1987 | Tamura et al. | 384/420 |

(Continued)

FOREIGN PATENT DOCUMENTS

DE          853990 C        10/1952

(Continued)

*Primary Examiner* — Marcus Charles
(74) *Attorney, Agent, or Firm* — Laurence A. Greenberg; Werner H. Stemer; Ralph E. Locher

(57) ABSTRACT

An axial bearing for a turbocharger contains a through hole for a shaft and at least one at least partially or completely circulating segment section on a first and second side of the axial bearing. At least one bearing surface is disposed in the segment section. At least one oil pocket is on the first side of the axial bearing. The oil pocket is connected to at least one recess opening outwards, the recess being configured such that it connects the oil pocket for oil supply purposes to the respective segment section and the bearing surface(s) thereof on the first and second side of the axial bearing.

9 Claims, 2 Drawing Sheets

U.S. PATENT DOCUMENTS

| | | | |
|---|---|---|---|
| 5,178,471 A * | 1/1993 | Roessler et al. | 384/369 |
| 5,308,169 A | 5/1994 | Baker et al. | |
| 5,564,172 A * | 10/1996 | Klann | 29/227 |
| 5,626,470 A | 5/1997 | Gerhardt | |
| 6,024,495 A | 2/2000 | Loos et al. | |
| 6,499,884 B1 * | 12/2002 | Svihla et al. | 384/138 |
| 6,502,994 B2 * | 1/2003 | Jackson | 384/420 |
| 6,669,372 B1 * | 12/2003 | Martin | 384/303 |
| 6,698,097 B1 | 3/2004 | Miura et al. | |
| 6,709,160 B1 * | 3/2004 | Ward et al. | 384/286 |
| 6,827,494 B2 * | 12/2004 | Aguilar | 384/121 |
| 7,198,406 B2 * | 4/2007 | Watai et al. | 384/420 |
| 7,401,980 B2 * | 7/2008 | Krauss et al. | 384/420 |
| 2006/0018578 A1 | 1/2006 | Krauss et al. | |
| 2006/0165325 A1 * | 7/2006 | Link et al. | 384/123 |

FOREIGN PATENT DOCUMENTS

| | | |
|---|---|---|
| DE | 19641673 A1 | 4/1998 |
| DE | 102008052189 A1 * | 6/2010 |
| EP | 0599520 A1 | 6/1994 |
| EP | 1619356 A1 | 1/2006 |
| JP | 63092817 A | 4/1988 |
| JP | 2000352422 A | 12/2000 |
| JP | 2002332803 A | 11/2002 |
| WO | 9220904 A1 | 11/1992 |

* cited by examiner

AXIAL BEARING FOR A TURBOCHARGER

BACKGROUND OF THE INVENTION

Field of the Invention

The invention relates to an axial bearing which can be used in particular with turbochargers in, for example, vehicles.

In general, turbochargers are used to improve the efficiency of an internal combustion engine, and hence to raise its power. For this purpose, a shaft is mounted in the housing of the turbocharger, for example by means of two radial bearings, so that it can rotate about its longitudinal axis. Appropriately arranged on the shaft are a turbine wheel and a compressor wheel. Due to fluid flows, which impact on the turbine wheel and the compressor wheel, strong axial forces can arise. Such axial forces cannot be suitably accommodated by the radial bearings, so that accordingly at least one axial bearing is provided.

The shaft bearings in a turbocharger are normally subject to very high demands. Thus, the turbocharger is exposed to very high temperatures because, for example, hot exhaust gas is used to drive the turbine wheel. Furthermore, the shaft of a turbocharger reaches very high rotational speeds, for example up to 300,000 r.p.m. For this reason, the rotating parts of the turbocharger must be very precisely balanced up, to keep the incidence of vibrations as low as possible.

Damage to the axial and radial bearings can easily arise from rapid engine starts, for example in cold ambient conditions, as a result of the delay in the feeding of oil to the turbocharger.

An axial bearing is known from the prior art, as disclosed in EP 1 619 356, in which wedge-shaped surfaces are arranged around a through hole. Here, the wedge-shaped surfaces are separated from each other by several grooves, through which the wedge-shaped surfaces are supplied with lubricating oil. Here, some of the grooves are extended towards the outside, and open out into oil pockets. In addition, the bearing surfaces are surrounded by a circumferential groove, through which the lubricating oil can flow away after it has flowed through the bearing, the cross-sectional area of this groove being smaller than the cross-sectional area of the extended grooves, to ensure an adequate oil flow for the shaft. In operation, the oil pocket receives lubricating oil under pressure. The oil flows through the grooves to the rotating shaft and is distributed by it in a circumferential direction, by which means even the grooves which are arranged on the other side of the axial bearing can be supplied with lubricating oil.

Also known, from EP 0 599 520, is a thrust bearing for a turbocharger in which an oil reservoir is connected via a borehole to a through hole.

However, thrust bearings in which oil pockets located at the outside are connected via a borehole with a segment area located further inside have the disadvantage that chips and burrs form in production. The chips, in particular, can easily block up the boreholes if they are not cleanly removed. Furthermore, burrs can also lead to a narrowing of the borehole, if they project into it.

BRIEF SUMMARY OF THE INVENTION

Accordingly, the object of the present invention is to provide an axial bearing, which has a simple construction and which permits suitable lubrication, by which blockage of the oil feed can be prevented.

Correspondingly, in accordance with the invention an axial bearing is provided, in particular for a turbocharger, with:

a through hole for a shaft,
with at least one segment section which runs at least partially or completely around the circumference on a first side and on a second side of the axial bearing, at least one contact surface being arranged on the segment section,
at least one oil pocket on the first side of the axial bearing, wherein the oil pocket is connected with at least one recess which is open towards the outside, which is designed in such a way that it connects the oil pocket with the segment section concerned and its contact surface or surfaces, as applicable, on the first and second sides of the axial bearing, to provide an oil feed.

The axial bearing thereby has the advantage that it is possible to provide in a very simple manner a suitable oil feed for the segment sections on both sides of the axial bearing. Here the lubricating oil is not, as in the prior art, fed to the other side of the axial bearing via the through hole for the shaft, for example, of a turbocharger. Furthermore, the recess, which is open in the upward direction, can be very simply manufactured, without any resulting chips or burrs which block up or narrow the recess, as is the case with state of the art bore holes.

Advantageous embodiments and developments of the invention emerge from the subclaims and the description which makes reference to the drawings.

In accordance with one embodiment of the invention, the recess is designed in the form of a slot. This slot can then be provided to such a depth in the axial bearing that it affords an oil feed to the segment sections and their contact surfaces on both sides of the axial bearing. Here, the slot has the advantage that it can be very simply manufactured, for example by means of milling. Alternatively, the slot can also be shaped into the axial bearing.

In another embodiment of the invention, the recess is in the form of a groove and a through cut-out. Here, the groove is designed in such a way that it connects the oil pocket to the segment section on the first side of the axial bearing. In addition, the through cut-out is arranged in such a way, for example, that it connects the groove and/or the segment section on the first side of the axial bearing with the segment section on the second side and thus establishes an oil feed to the second segment section.

In a further embodiment of the invention, the groove is, for example, manufactured by milling or is shaped into the axial bearing. The through cut-out can also be formed into the axial bearing or manufactured by boring or milling. In this way, the cut-out in accordance with the invention can be very easily manufactured. Furthermore, the boring or milling step can here be simply incorporated into a production process.

According to a further embodiment of the invention, the slot or groove, as applicable, can be designed in addition with at least one transitional chamfer.

In a further embodiment of the invention the through hole, through which the shaft passes, is provided with an inner shoulder on the first and/or the second side. This inner shoulder is to prevent oil from simply flowing completely unhindered out of the segment section or segment space, as applicable, into the through hole. The quantity of oil in the through hole can be reduced by this inner shoulder without a detrimental effect on the oil supply to the load-bearing segments or contact surfaces, as applicable.

The inventive axial bearing is suitable, for example, as a bearing for a shaft in a turbocharger used in motor vehicles or other vehicles. Basically, however, the use of the inventive axial bearing is not restricted to the application situations cited above, but it can be used in numerous different areas in which axial bearings are required.

The invention is explained in more detail below, by reference to the exemplary embodiments shown in the schematic figures in the drawings. These show:

DESCRIPTION OF THE INVENTION

In all the figures, elements and devices which are the same or functionally the same, as applicable, are given the same reference marks, unless otherwise specified.

Figure 1A:
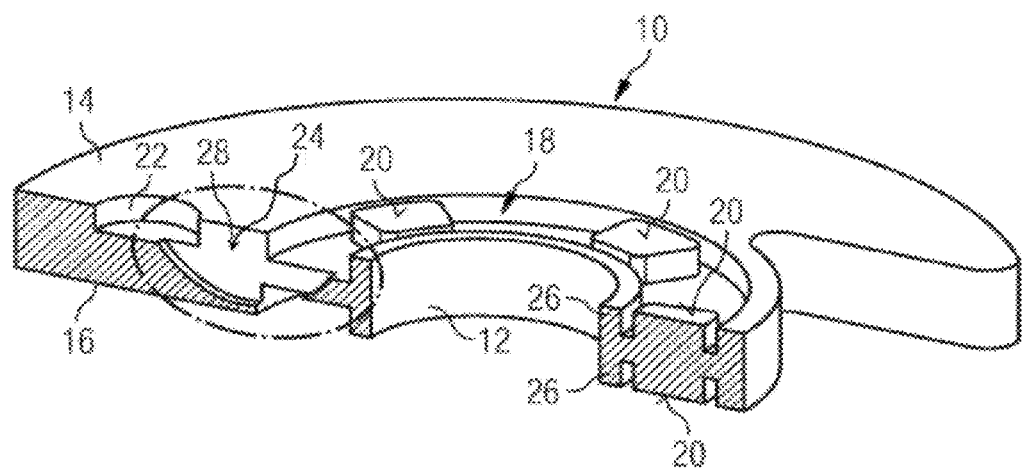
FIGS. 1a, b a perspective sectional view of an axial bearing in a first embodiment of the invention.
Figure 1B:
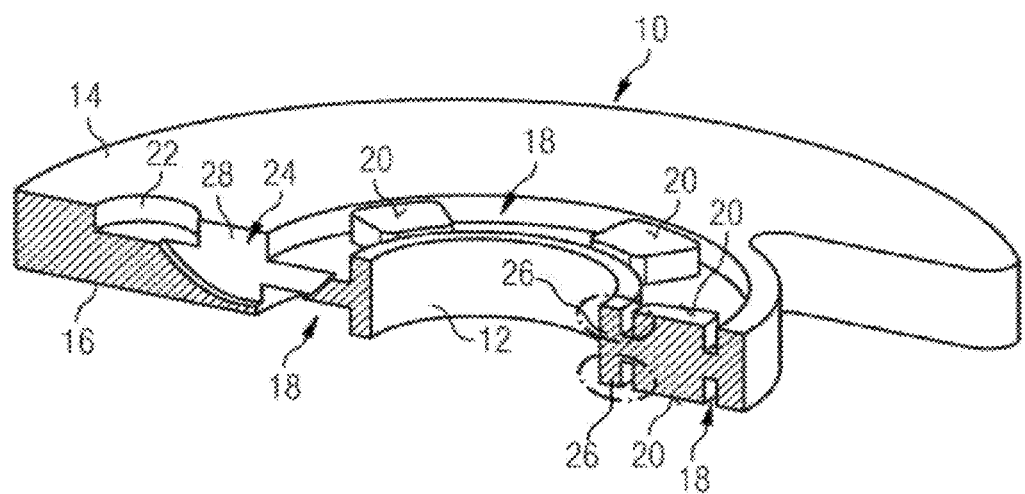

FIGS. 1a and 1b show a perspective sectional view of an axial bearing 10 in accordance with a first embodiment of the invention. Here, the axial bearing 10 has for example a form which is essentially disk-shaped.

Here, the axial bearing 10 is provided with a through hole 12 through which, for example, the shaft of a turbocharger (not shown) can be passed. In addition, at least on a first side 14 the axial bearing 10 has a segment section 18 or segment space, as applicable, in the form of a depression which preferably runs around its circumference. Arranged in the segment section 18 are contact surfaces 20 or segments, as applicable. The contact surfaces 20 or segments, as applicable, are here wedge-shaped in design for example and are arranged radially around the through hole 12. The contact surfaces 20 can however also have any other shape which is suitable as a contact surface.

The axial bearing 10 has, in addition, at least one oil pocket 22 on the first side 14 of the bearing, the oil pocket 22 being arranged above the segment section 18. The oil pocket 22 is here connected via a recess 24 to the through hole 12. The recess 24 here is embodied, for example, as a slot 28 which is, for example, milled into the surface of the axial bearing 10 by means of a milling cutter. The recess 24 or slot 28, as applicable, is here designed such that it connects at least the oil pocket 22 to the segment section 18 on the same side of the axial bearing 10.

In the same way as on the first side 14, a segment section 18 or segment space, as applicable, can also be arranged on the second side 16 of the axial bearing, together with contact surfaces 20 or segments, as applicable. Like the contact surfaces 20 on the first side 14, the contact surfaces 20 can here be wedge-shaped in design, for example, or can have some other suitable shape. Here, the second side 16 can be designed without an oil pocket 22.

The recess 24 or slot 28, as applicable, provided in the axial bearing 10 can here be of such a depth that it connects the oil pocket 22 with the segment sections 18 on both sides 14, 16 of the axial bearing 20, as shown in FIGS. 1a and 1b. It is very simply possible in this way to realize an oil feed for both segment sections of the axial bearing.

Lubricating oil is directed via the oil pocket 22 through the recess 24 or the slot 28, as applicable, towards the through hole 12, or to be more accurate, to the segment sections 18 and the contact surfaces 20 on the two sides 14, 16 of the axial bearing 10.

In a further embodiment of the invention, there is the optional possibility of providing the through hole 12 in the axial bearing 10 with an inner shoulder 26 which stands proud of at least the segment section 18 on the first and/or the second side 14, 16 of the axial bearing 10 and delimits the relevant segment section 18 or segment space, as applicable.

Arranging the inner shoulder 26 directly on the through hole 12 in the axial bearing 10 essentially prevents lubricating oil from passing unhindered out of the segment space or segment section 18, as applicable, into the space in the through hole 12 for the shaft. The inner shoulder 26 reduces the quantity of oil in the through hole 12, without having any effect on the oil supply to the load-bearing segments or contact surfaces 20, as applicable. This makes it possible to forgo expensive oil feed arrangements for keeping the oil quantity low, such as are known from the prior art, where such arrangements have in turn a direct effect on the load-bearing capacity of an axial bearing.

It is already known from the prior art that the oil which is churned around in the region of the axial bearing by the shaft of the turbocharger leads to an increased power loss in this region. A reduction in the quantity of oil leads to a reduction in the losses, and hence ultimately to an improvement in the overall efficiency of a turbocharger.

A recess 24 in the form of a slot 28 which is open in the upward direction has the advantage that the slot 28 can easily be integrated as a constructional element in an existing processing step. In addition, with such a slot 28 it is possible to avoid such problems as exist with holes known from the prior art which are fully enclosed. Thus, in the manufacture of an open slot 28 no chips or burrs are produced by which the oil feed can be narrowed or even blocked up, as is the case with enclosed holes. In particular if the holes are relatively long, they can only be poorly cleaned, and are easily blocked.

Furthermore, the slot 28 can very easily be manufactured by a milling process. Chips which arise when doing so can be removed without problem, because the slot 28 is open towards the outside and, unlike a bored hole, is not completely surrounded. Alternatively, it is also conceivable that instead of manufacturing the slot 28 by milling, the axial bearing 10 is made by shaping it with an appropriate slot 28.

Optionally, the slot 28 can be manufactured with a transitional chamfer (not shown) on one or both sides 14, 16 of the axial bearing 10. Here, the oil feed is realized by the slot 28, which starts at the central through hole 12 and ends in the oil pocket 22.

Figure 2:
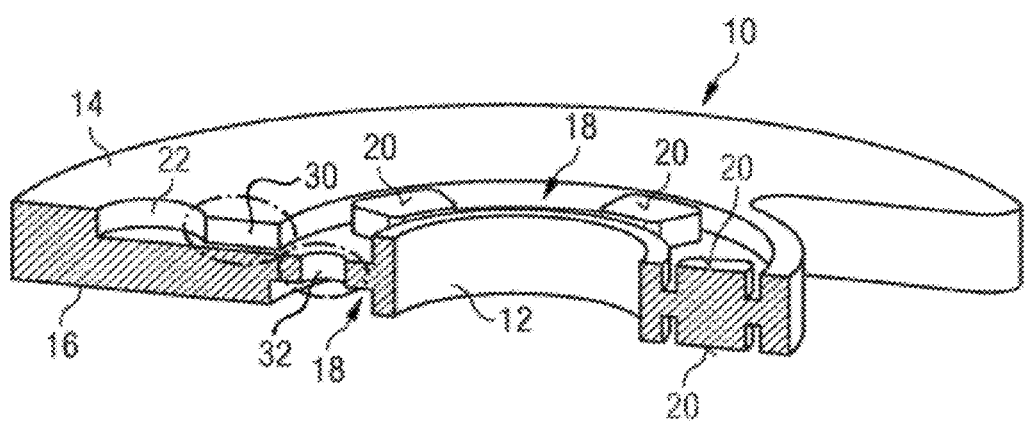
FIG. 2 a perspective sectional view of an axial bearing in accordance with a second embodiment of the invention.

In a second, alternative embodiment of the invention, such as is shown in FIG. 2, the axial bearing 10 has a recess 24 which, instead of being a slot 28 is a groove 30 on the first side 14 of the axial bearing 10, together with a through cut-out 32. Here, the groove 30 extends from the oil pocket 22 to the segment section 18 on the first side 14, in order to supply this and the contact surfaces 20 there with lubricating oil.

In the segment section 18, at least one through cut-out 32 is provided in addition, in order to supply the segment sections 18 on the second side of the axial bearing 10 with lubricating oil. In doing this it is in principle possible again to provide the groove 30 of the recess 24 with a transitional chamfer (not shown) on one or both sides 14, 16 of the axial bearing 10.

As in the first embodiment, an optional possibility is to provide in addition an inner shoulder 26 on at least one or both sides 14, 16 of the through hole 12. It is thereby possible to ensure an oil supply for the oil feed to the oil pocket 22 on the second side 16, via the through cut-out 32. As in the embodiment shown in FIGS. 1a and 1b, the lubricating oil passes from the oil pocket 22 through the through cut-out 30 to the other side 16 of the axial bearing 10 and in this way is fed to the segment section 18 or segment space there, and to the contact surfaces 20 or segments, as applicable.

The groove 30, which like the slot 28 is also open towards the outside, has the advantage that it too enables the formation of chips and burrs to be avoided, as is the case for holes conforming to the state of the art. Apart from this, the manufacture of the short groove 30 can also be very simply integrated into an existing processing step, such a groove 30 being overall very much easier to realize than a bored hole, so that manufacturing costs can be reduced.

The through cut-out 32 in the recess 24 has in addition the advantage that it is very simply possible to achieve an oil feed from the oil pocket 22 to the opposite-side segment section 18, on the second side 16 of axial bearing.

The through cut-out 32 can here be manufactured by boring or milling. The chips which result from doing so can be very easily removed because the hole is relatively short, as shown in FIG. 2. Alternatively, the axial bearing 10 with its through cut-out 32 can also be produced by shaping, wherein the through cut-out 32 need not necessarily be round, but can have any arbitrary shape.

Furthermore, in accordance with the invention it is possible to provide one, two or more such through cut-outs 32 or slots 28 in the axial bearing 10.

Although the present invention has been described above by reference to the preferred exemplary embodiments, it is not restricted to them, but can be modified in diverse ways. In doing so, the embodiments described above, in particular individual features of them, can be combined with each other.

So, for example, the slot 28 can also be combined with a through cut-out 32 in a recess 24. Here, the slot 28 does not need to be formed too deeply, but it is sufficient in this case if the slot 28 connects together the oil pocket 22 and the segment section 18 or its contact surfaces 20 on the first side 14 of the axial bearing 10, as appropriate. On the other hand, the through cut-out 32 establishes the connection to the segment section 18 on the second side 16 of the axial bearing 10. In principle, the through cut-out 32 can in this case be provided in the segment section 18, as shown in FIGS. 1a, 1b and 2. However, it can also be provided in the region of the slot 28 or the groove 30 or in a transition area between the slot 28 or the groove 30, as applicable, and the relevant segment area 18. In addition, the inner shoulder 26 on one or both sides of the axial bearing 10 is an optional feature.

The invention claimed is:

1. An axial bearing for a turbocharger, the axial bearing comprising:
    an axial bearing body having a first side, a second side, a through hole formed therein for receiving a shaft, segment sections formed therein and running one of at least partially and completely around a circumference on said first side and on said second side;
    contact surfaces disposed on said segment sections;
    said axial bearing body having an inner shoulder on at least one of said first side and said second side and disposed next to said through hole through which the shaft passes;
    said axial bearing body having at least one oil pocket formed therein on said first side;
    said axial bearing body having at least one recess formed therein and opening toward an outside, said oil pocket being connected with said at least one recess, said recess configured such that said recess connects said oil pocket with said segment sections and said contact surfaces on said first and second sides, to provide an oil feed said recess being embodied as at least one of:
    a slot, said slot provided to such a depth in said axial bearing body that said slot forms the oil feed to said segment sections and associated said contact surfaces on said first and second sides; and
    a groove and a through cut-out, said groove connecting said oil pocket to a first of said segment sections on said first side of said axial bearing body and said through cut-out establishes said oil feed to a second of said segment sections on said second side of said axial bearing body.

2. The axial bearing according to claim 1, wherein said slot or said groove is manufactured by a milling process.

3. The axial bearing according to claim 1, wherein said groove or said through cut-out is manufactured by boring.

4. The axial bearing according to claim 1, wherein said slot or said groove has a transitional chamfer.

5. The axial bearing according to claim 1, wherein said inner shoulder delimits said segment section concerned on said through hole.

6. The axial bearing according to claim 1, wherein said slot or said groove is shaped into said axial bearing body.

7. The axial bearing according to claim 1, wherein said groove or said through cut-out is shaped into said axial bearing body.

8. A turbocharger, comprising:
    an axial bearing containing:
        an axial bearing body having a first side, a second side, a through hole formed therein for receiving a shaft, segment sections formed therein and running one of at least partially and completely around a circumference on said first side and on said second side;
        contact surfaces disposed on said segment sections;
        said axial bearing body having an inner shoulder on at least one of said first side and said second side and disposed next to said through hole through which the shaft passes;
        said axial bearing body having at least one oil pocket formed therein on said first side;
        said axial bearing body having at least one recess formed therein and opening toward an outside, said oil pocket being connected with said at least one recess, said recess configured such that said recess connects said oil pocket with said segment sections and said contact surfaces on said first and second sides, to provide an oil feed said recess being embodied as at least one of:
        a slot, said slot provided to such a depth in said axial bearing body that said slot forms the oil feed to said segment sections and associated said contact surfaces on said first and second sides; and
        a groove and a through cut-out, said groove connecting said oil pocket to a first of said segment sections on said first side of said axial bearing body and said through cut-out establishes said oil feed to a second of said segment sections on said second side of said axial bearing body.

9. An axial bearing for a turbocharger, the axial bearing comprising:
    an axial bearing bodying having a substantially plate shape with a first side, a second side, and a centrically disposed through-hole formed therein for receiving a shaft;
    at least partially encircling segment sections, at least one of said at least partially encircling segment sections disposed on each of said first side and said second side of said axial bearing body, said at least partially encircling segment sections each being an indentation concentrically disposed around said through-hole of said axial bearing body;
    supporting segments having contact surfaces, at least one of said supporting segments disposed in each of said at least partially encircling segment sections;
    at least one oil pocket disposed on said first side of said axial bearing body and disposed radially outside of said at least one partially encircling segment sections; and said axial bearing body having at least one slotted recess formed therein and open toward said first side and disposed such that and formed to such a depth to supply oil to said contact surfaces of said supporting segments on both of said first and second sides of said axial bearing body, said slotted recess connecting said at least one oil pocket, to each of said at least partially encircling segment sections on said first and second sides of said axial bearing body.

* * * * *